May 16, 1933.  E. M. BOURNONVILLE  1,908,680
INTERNAL COMBUSTION ENGINE
Filed Aug. 4, 1930   2 Sheets-Sheet 1

INVENTOR
Eugene M. Bournonville
BY
ATTORNEY

May 16, 1933.  E. M. BOURNONVILLE  1,908,680
INTERNAL COMBUSTION ENGINE
Filed Aug. 4, 1930   2 Sheets-Sheet 2
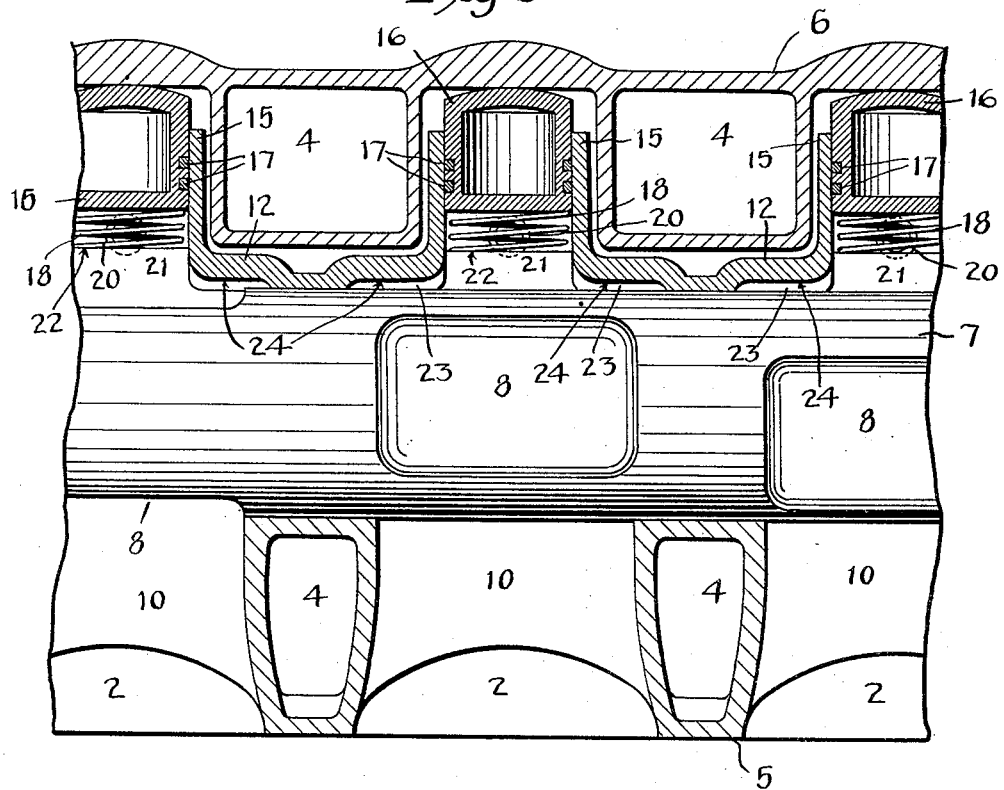
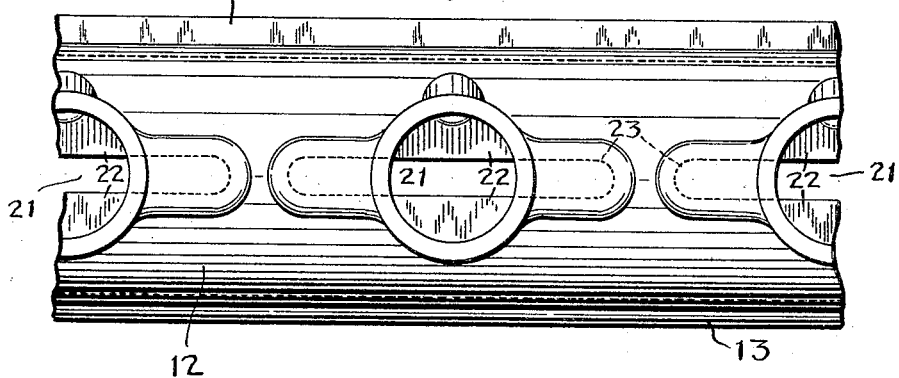

Patented May 16, 1933

1,908,680

UNITED STATES PATENT OFFICE

EUGENE M. BOURNONVILLE, OF JERSEY CITY, NEW JERSEY

INTERNAL COMBUSTION ENGINE

Application filed August 4, 1930. Serial No. 472,881.

This invention relates to internal combustion engines and to valves of the rotary plug type for such engines.

An object of the invention is to avoid as much as possible friction in the valve so as to insure the maintenance of a lubricating and sealing oil film, and to reduce to a minimum the wearing of the valve and its casing.

An object of the improvement herein described is to provide a balanced pressure valve having a yielding, flexible or floating bearing, to keep the rotary valve element properly seated irrespective of contraction and expansion of the valve. Another object is to provide a rotary valve having a yielding or flexible ported bearing and means whereby this bearing is held or pressed against the rotary element by pressure communicated from the combustion chamber, but only with sufficient pressure so that the valve turns freely and leakage is prevented.

In the preferred embodiment of the invention, there is a balancing port in the yielding bearing connected by a duct with the combustion chamber, and there is also an expansible chamber device, such as a piston and cylinder for example, likewise connected with the combustion chamber, all for holding the yielding bearing to the rotary element and the latter to its seat.

Pressure acting through the balancing port against the valve counterbalances more or less the opposing pressure on the valve through the cylinder port, and a differential of pressure against the upper and under sides of the yielding bearing is preferably utilized to keep all the parts in gentle but adequate bearing and sealing relation. The effect is that the rotary valve element keeps to its seat and the yielding bearing keeps to the valve, with little pressure between the surfaces, and while the bearing is always free to come and go with expansion and contraction of the valve.

Various modifications of the plan herein disclosed will suggest themselves to those skilled in the art.

In the accompanying drawings forming part hereof:

Fig. 3 is a vertical longitudinal section; and

Fig. 4 is a plan view of the yielding bearing, showing only a portion of its length.

Figure 1:
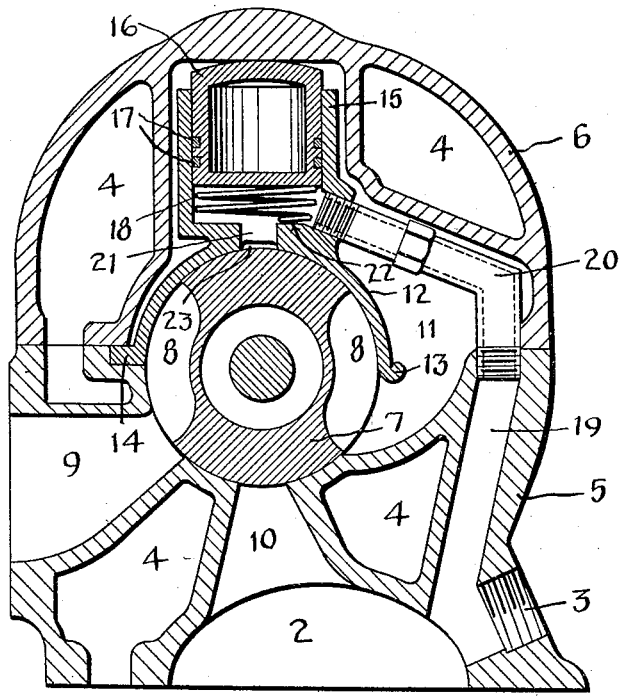
Fig. 1 is a cross-sectional view through the upper part of one cylinder of the engine and the valve which extends lengthwise over the tops of the cylinders, this section being taken substantially centrally of Fig. 3.
Figure 2:
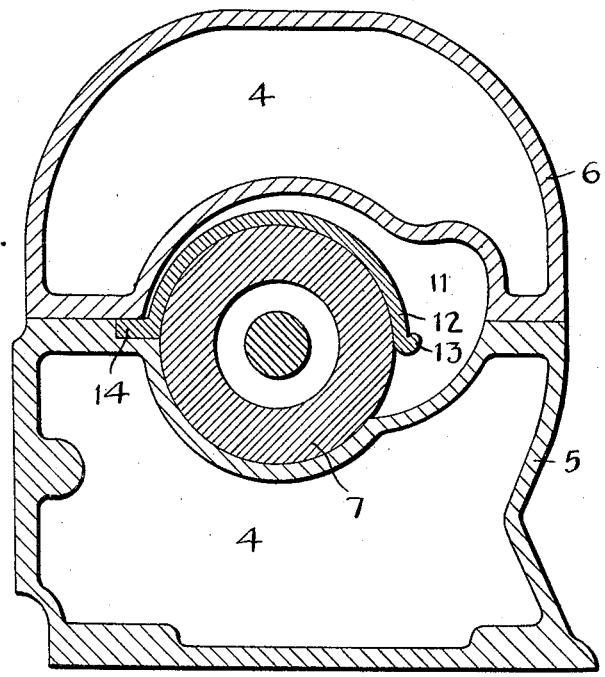
Fig. 2 is a cross-section of the valve head taken in a plane between cylinders of the engine.

The combustion chambers are marked 2, 3 is the location of the spark plug, and 4 are water-jacket spaces. The casting 5 may be detachable from the cylinder block or not, and it preferably has a detachable cap 6. The parts 5 and 6 form a casing for the cylindrical valve element 7.

The valve is more specifically, though not necessarily, of the combined intake and exhaust variety. Accordingly, the rotary valve element is shown provided with transfer ports 8, which, as the valve element turns, connect exhaust ports 9 at one side of the casing with cylinder ports 10 at the bottom, and then connect these ports with intake spaces or manifolds 11 in the other side of the casing. It will be understood that the valve-casing and the rotary element extend along over the tops of the several cylinders of the engine, and that the rotary element, which may be sectional, is provided with one or more of the transfer ports 8, properly positioned, for each of the cylinders.

The part 5 is formed with part of a cylindrical bore affording a seat or fixed bearing for the turning element, and the bearing also includes a flexible top wing 12 curving over the rotary element, as in my Patent #1,646,949, dated October 25, 1927. The wing 12 is preferably free at the end 13 of the curve and preferably anchored or restrained at the other end. At this end the wing may be in one piece with the fixed part of the valve-casing as shown in one of the embodiments disclosed in the patent referred to, but I prefer to make it a separate piece having a flange 14 which is slipped into a groove at one side of the valve so that the wing can shift a little laterally the better to adjust itself to the rotary element.

The bearing surfaces are, of course, designed to afford seals between the cylinder port 10 and the intake and exhaust spaces on either hand, and between the intake and exhaust spaces. The wing or yielding bearing 12 may be in one piece lengthwise of the valve or it may be sectional.

Opposite each of the cylinder ports 10 it is formed with a small cylinder 15 containing a piston 16 having compression cylinder rings 17, this piston being held up against the top of the cap 6 by a spring 18. Each of these cylinder chambers is in constant communication with the corresponding combustion chamber 2 by way of a duct 19 in the casting 5 and a pipe 20. The latter is sufficiently flexible to allow the requisite degree of freedom for the yielding bearing 12, and its flexibility may be increased, if desired, by the provision of suitable joints.

A balancing port 21 is formed through the bottom of each cylinder, leaving surfaces 22 against which pressure communicated from the combustion chamber acts to press the bearing 12 against the rotary valve element in opposition to the fixed seat in the casting 5.

The area of the port 21 through which the fluid pressure acts against the rotary element to balance the pressure exerted through the cylinder port 10 is preferably approximately equal to the area of the cylinder port, for which reason the port 21 is extended lengthwise of the valve in the form of grooves 23 in the inner surface of the yielding bearing. The internal area of the cylinder 13 should be a little larger than the area of either the cylinder port 10 or the balancing port 21 with its extensions 23, and it follows from this that the total area of the surfaces 22 against which the fluid pressure acts to press the yielding bearing to the rotary element is a little greater than the total area of the under surfaces 24 against which the fluid pressure acts in a manner tending to move the yielding bearing away from the rotary element.

The yielding bearing may be bodily movable and/or inherently flexible, though inherent flexibility is greatly to be desired.

The cylinder 15 and piston 16 form a fluid pressure device or expansible chamber, other forms and arrangements of which will suggest themselves.

The arcs of the bearing surfaces at opposite sides of the balancing port 21, 23 should be longer than the transfer ports in order to avoid any communication between this port and either the intake manifold 11 or the exhaust port 9.

Important advantages of the invention are that the bearing or seat for the rotary valve element expands or contracts in perfect adjustment with the rotary element, that closeness of fit is preserved at all times with only sufficient pressure of the surfaces against each other for sealing, that the pressure between the surfaces is always substantially the same at top and bottom, that because of these conditions a lubricating film is preserved and friction, wear and resistance to turning are reduced to a minimum, that the pressure in the engine cylinder during the compression, power and exhaust strokes does not tend to force the rotary member away from its seat or to create excessive pressure of the rotary element against the roof of the bearing, and that this fluid pressure acts to hold the yielding bearing to the rotary element and the latter to its seat during said strokes. During the exhaust stroke the spring 18 tends to hold the yielding roof part 12 to the rotary element, though the resilience of this part or the manner in which it is anchored may suffice without that.

I do not limit myself to the precise or complete embodiment herein described and illustrated, since the yielding or flexible bearing, balancing port and/or means for applying pressure communicated from the combustion chamber to press or hold the yielding bearing to the rotary valve element and to keep the latter properly seated are within the scope of the invention and may be combined in specifically different ways to realize part or all of the advantages of the invention.

It will be understood that terms of orientation are relative, since the engine need not be upright, and since the valve or valves need not necessarily be in the position shown.

I claim:

1. In an internal combustion engine, the combination with a rotary valve element of the plug type and its casing having an engine cylinder port, of a yielding bearing in the casing having a balancing port and a cylinder connected by a duct with the combustion chamber, and a piston fitting said cylinder to thrust against the casing.

2. In an internal combustion engine, the combination with a rotary valve element of the plug type and its casing having an engine cylinder port, of a yielding bearing in the casing having an expansible chamber device to thrust against the casing, and a balancing port, both connected by a duct with the combustion chamber.

3. In an internal combustion engine, the combination with a rotary valve element of the plug type and its casing having an engine cylinder port, of a yielding and flexible bearing in the casing having an expansible chamber device to thrust against the casing, and a balancing port, both connected by a duct with the combustion chamber.

4. In an internal combustion engine, the combination with a rotary valve element of the plug type and its casing having an engine cylinder port, of a yielding bearing in the casing having a balancing port and a cylinder connected by a duct with the combustion chamber, a piston fitting said cylinder to thrust against the casing, and a spring pressing the piston.

5. In an internal combustion engine, the combination with a rotary valve element of the plug type and its casing having an engine cylinder port, of a yielding and flexible bearing in the casing having an expansible chamber device to thrust against the casing, a balancing port, both connected by a duct with the combustion chamber, and a spring in said expansible chamber.

6. In an internal combustion engine, the combination with a rotary valve element of the plug type and its casing having an engine cylinder port, of a yielding bearing in the casing having an expansible chamber device to thrust against the casing and a balancing port opening from said chamber and provided with extensions in the under part of the bearing, and a duct connecting the expansible chamber with the combustion chamber.

7. In an internal combustion engine, the combination with a rotary valve element of the plug type and its casing having an engine cylinder port, of a yielding bearing in the casing having an expansible chamber device to thrust against the casing, and a balancing port, both connected by a duct with the combustion chamber, the area of the surfaces of said yielding bearing against which the fluid pressure acts to press the bearing against the rotary element being greater than the area of the surfaces against which said pressure acts in a direction tending to move the bearing away from the rotary element.

8. In an internal combustion engine, the combination with a rotary valve element of the plug type and its casing having an engine cylinder port, of a yielding bearing in the casing having a balancing port opening through the bearing face and connected by a duct with the combustion chamber of the engine, and means causing said bearing to be pressed against the rotary element by the pressure communicated from the combustion chamber.

9. In an internal combustion engine, the combination with a rotary valve element of the plug type and its casing having a seat with a cylinder port therein, of a yielding bearing opposed to said seat having a balancing port opening through the bearing face and connected by a duct with the combustion chamber.

10. In an internal combustion engine, the combination with a rotary valve element of the plug type and its casing having a seat with a cylinder port therein, of a flexible bearing held at one end and arching over the rotary element, said flexible bearing having a balancing port connected by a duct with the combustion chamber.

11. In an internal combustion engine, the combination with a rotary valve element of the plug type and its casing having a seat with a cylinder port therein, of a bearing opposed to said seat and having a balancing port opening through the bearing face and connected by a duct with the combustion chamber, so that pressure communicated from the combustion chamber acts directly against the rotary element to hold it properly seated.

12. In an internal combustion engine, the combination of a rotary valve element, a cylinder port controlled by the valve element, a yielding bearing in which the valve is mounted, a balancing port closed at one end by the valve element so that gas in the balancing port exerts a direct pressure on the valve element, and means for utilizing pressure communicated from the combustion chamber for holding said yielding bearing to the rotary element.

13. In an internal combustion engine, a valve of the rotary plug type comprising a casing having a bearing containing a port to the combustion chamber, an opposed, yielding bearing having a balancing port opening through the bearing face, and means for communicating pressure from the combustion chamber to the yielding bearing and through said balancing port against the rotary valve element to keep the yielding bearing to the valve element and the valve element to its seat with minimum friction between the surfaces.

14. In an internal combustion engine, a valve of the rotary plug type comprising a casing having a bearing containing a port to the combustion chamber, an opposed, yielding bearing having a balancing port, and means for communicating pressure from the combustion chamber to the yielding bearing and through said balancing port against the rotary valve element to keep the yielding bearing to the valve element and the valve element to its seat with minimum friction between the surfaces, said yielding bearing having upper and under surfaces exposed to the fluid pressure, there being a differential between said surfaces in favor of the upper surface.

15. In an internal combustion engine, a valve of the rotary plug type comprising a casing having a bearing containing a port to the combustion chamber, an opposed, yielding bearing having a balancing port opening through the bearing face, means placing said balancing port in communication with the combustion chamber, and means whereby pressure from the combustion chamber is applied to the yielding bearing to keep it gently to the valve element.

16. In an internal combustion engine having a rotary valve of the plug type, the combination of a casing having opposed bearing portions, one of which at least is of a yielding nature, both of said bearing portions having ports communicating with the combustion chamber of the engine, one of said ports being a passage port and the other a balancing port, and means for applying sufficient fluid pressure from the combustion chamber to the yielding bearing to keep the bearing surfaces and the plug surfaces in close proximity.

17. In an internal combustion engine, the combination of a rotary valve element of the plug type, a bearing having two opposed portions, one at least of which is yielding, both said bearing portions having ports communicating with the combustion chamber, and means whereby fluid pressure from the combustion chamber is also applied to the yielding bearing, so that the plug and its bearings are kept in close relation with minimum friction between their surfaces.

18. In an internal combustion engine, a combined intake and exhaust valve comprising a rotary valve element of the plug type, a casing having a seat for the valve element containing an inlet and exhaust port to the combustion chamber, a yielding bearing wing anchored at one end and arching over the valve element, said bearing wing containing a balancing port, and means for applying fluid pressure from the combustion chamber through said balancing port against the valve element and also to control the wing.

19. In an internal combustion engine, a valve of the rotary plug type; a valve casing having a port communicating with a cylinder of the engine; a bearing in which the valve is journaled for rotary movement to control the flow of gas through the port; a pressure chamber closed at one side by the valve, and located in position so that the gas in the pressure chamber acts against the valve in opposition to the pressure in the cylinder tending to move the valve away from the port; and a conduit connecting the pressure chamber with the cylinder.

EUGENE M. BOURNONVILLE.